United States Patent
Liu et al.

(10) Patent No.: US 10,443,695 B2
(45) Date of Patent: Oct. 15, 2019

(54) LINEAR ACTUATOR

(71) Applicant: HIWIN MIKROSYSTEM CORP., Taichung (TW)

(72) Inventors: Chin-Sung Liu, Taichung (TW); Wei-Min Chen, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 317 days.

(21) Appl. No.: 15/466,313

(22) Filed: Mar. 22, 2017

(65) Prior Publication Data

US 2018/0274642 A1    Sep. 27, 2018

(51) Int. Cl.
*F16H 25/24* (2006.01)
*F16H 25/20* (2006.01)

(52) U.S. Cl.
CPC ....... *F16H 25/24* (2013.01); *F16H 2025/204* (2013.01); *F16H 2025/2034* (2013.01); *F16H 2025/2445* (2013.01)

(58) Field of Classification Search
CPC ............. F16H 25/24; F16H 2025/2034; F16H 2025/204; F16H 2025/2445
See application file for complete search history.

(56) References Cited

U.S. PATENT DOCUMENTS

| | | | | |
|---|---|---|---|---|
| 5,868,032 A | * | 2/1999 | Laskey | F16F 9/58 188/322.12 |
| 5,910,692 A | * | 6/1999 | Saeda | F16H 25/20 310/13 |
| 2013/0152717 A1 | * | 6/2013 | Kopecek | B64C 13/28 74/89.39 |
| 2015/0040701 A1 | * | 2/2015 | Shimomura | F16H 25/2219 74/89.23 |
| 2015/0330488 A1 | * | 11/2015 | Combernoux | F16H 25/2266 74/89.23 |

FOREIGN PATENT DOCUMENTS

WO    WO 2014/092255    6/2014

* cited by examiner

*Primary Examiner* — David M Fenstermacher
(74) *Attorney, Agent, or Firm* — Guice Patents PLLC

(57) ABSTRACT

A linear actuator including the gap compensating unit with the joints and the elastic units to provide the elasticity thereby compensating the offset during the linear motion and maintaining the stability and linearity.

5 Claims, 6 Drawing Sheets

_US 10,443,695 B2_

LINEAR ACTUATOR

BACKGROUND OF THE INVENTION

Field of the Invention

The invention relates to a linear actuator, and more particularly to a linear actuator improving the offset in a linear movement.

Description of Related Art

With respect to the ACME screw and ball screw transmission, the rotary motion is conversed into linear motion by rotating the nut disposed on the screw. However, the inaccuracy during the conversion may occur due to the process capability, and the tolerances of geometry, size and linearity.

In order to enhance the accuracy, the WO2014092255 patent disclosed a tube holds a positioned linear bearing to support the inner tube and guide the linear motion thereof. In addition, it also disclosed a non-circular restricting unit disposed on the inner tube and reciprocating along the inner tube thereby restricting the rotation between the inner tube and the outer tube.

Although the above conventional technology can provide the support and guide during the linear motion to prevent from unnecessary rotation, the offset compensated by the gap between ball and the ball retainer of the linear bearing is too limited to improve the accuracy during the linear motion.

SUMMARY OF THE INVENTION

To improve the remaining drawbacks of the prior arts, the present invention provides a linear actuator to improve the offset and the linearity in a linear movement.

The present invention provides a linear actuator including a case, an actuating unit and a gap compensating unit. The case comprises a body and a space, and the actuating unit is held in the space. The gap compensating unit reciprocates on the actuating unit and comprises a base, a plurality of apertures, a plurality of joints and a plurality of elastic units. The apertures are positioned on two opposite sides of the base. The joints and the elastic units are respectively received in the apertures wherein the elastic units are disposed against the joints and an inner wall of the body.

According to an embodiment of the present invention, the gap compensating unit comprises two covers respectively disposed on the two opposite sides of the base, each of the cover comprises a plurality of openings, and the base comprises a plurality of holes corresponding to the openings to form the apertures.

According to an embodiment of the present invention, the diameter of the opening is less than the diameter of the hole.

According to an embodiment of the present invention, the gap compensating unit comprises a plurality of bolts, each of the cover comprises a plurality of punctures, and the base comprises a plurality of screw holes whereby the bolts are fastened within the punctures and the screw holes.

According to an embodiment of the present invention, the gap compensating unit comprises an axial hole positioned on the base to hold the actuating unit. According to an embodiment of the present invention, the joints are in the form of ball or pillar.

The present invention provides another linear actuator including a case, an actuating unit and a gap compensating unit. The case comprises a body and a space wherein the body comprises a plurality of apertures. The actuating unit is held in the space. The gap compensating unit is disposed on the body and comprises a plurality of joints and a plurality of elastic units wherein the joints and the elastic units are respectively received in the apertures, and the elastic units are respectively disposed against the joints and an inner wall of the body.

According to an embodiment of the present invention, the joints are in the form of ball or pillar.

According to an embodiment of the present invention, the space is encircled by the body, and the apertures are positioned on the middle of the body.

According to an embodiment of the present invention, the space is encircled by the body, and the apertures are positioned on the flank of the body.

In light of the above, the linear actuator of the embodiment of the present invention includes the gap compensating unit with the joints and the elastic units to provide the elasticity thereby compensating the offset during the linear motion and maintaining the stability and linearity.

DETAILED DESCRIPTION OF DISCLOSED EMBODIMENTS

Figure 1:
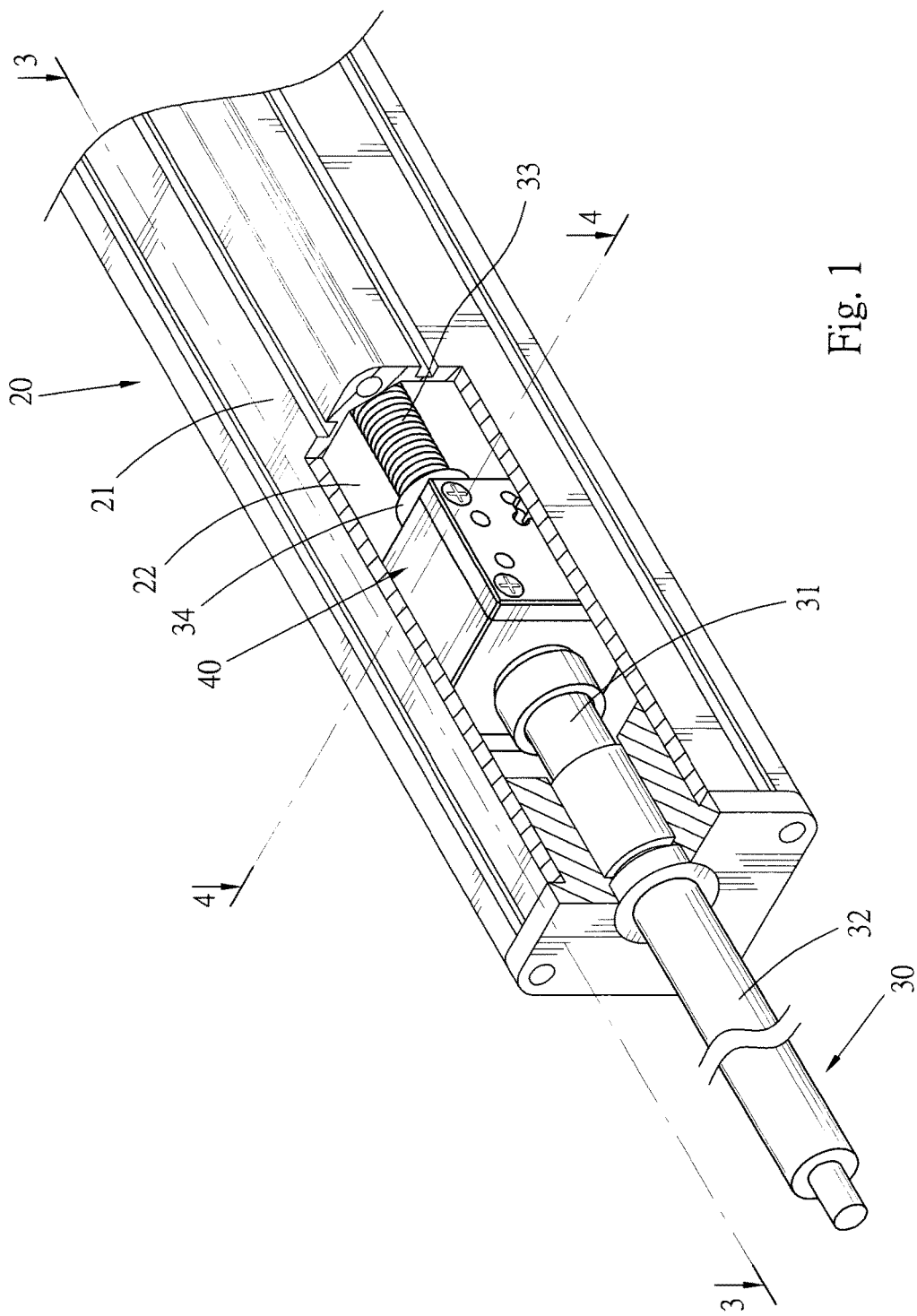
FIG. 1 is a schematic view of a first embodiment of the present invention.
Figure 2:
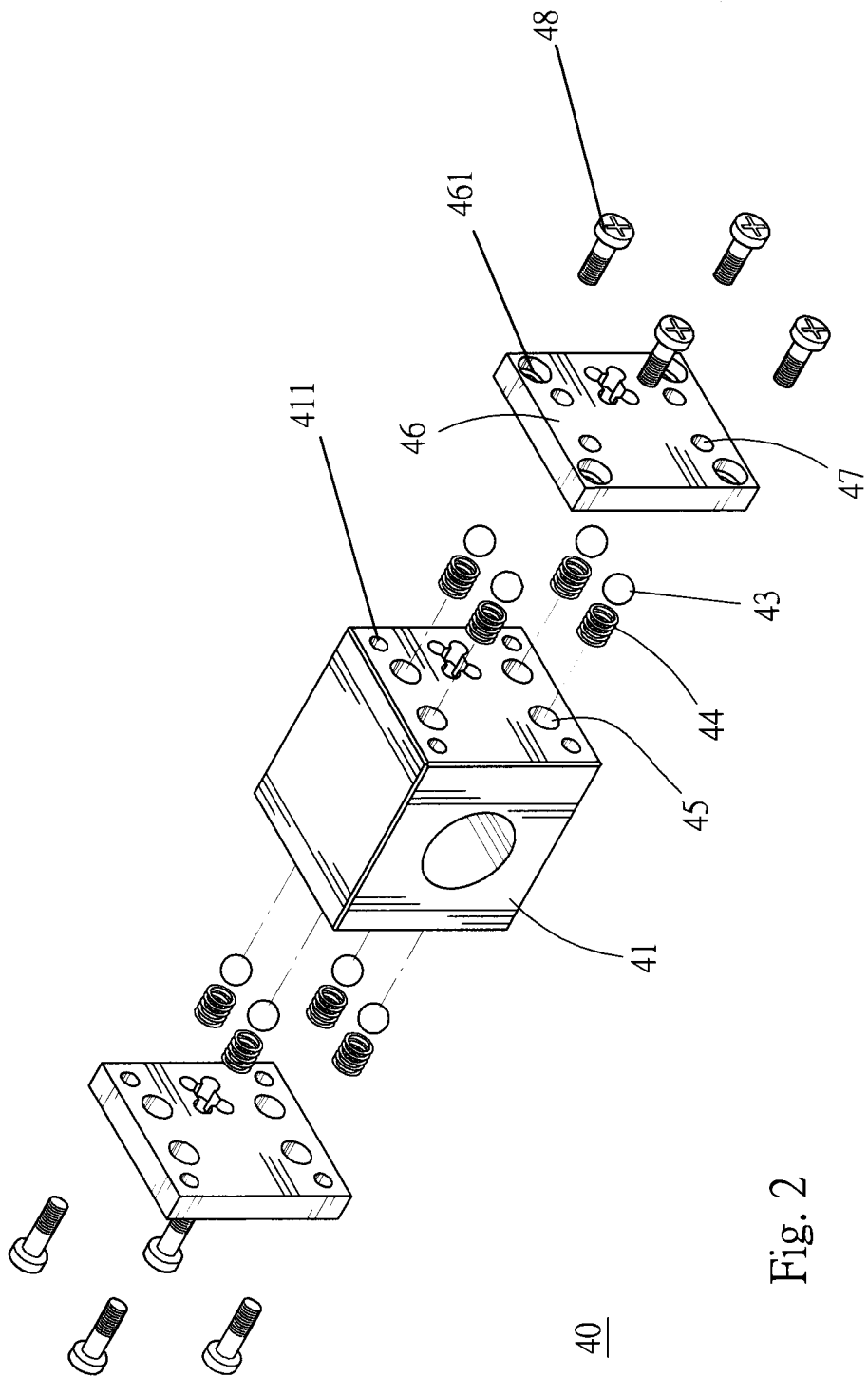
FIG. 2 is an exploded view of a gap compensating unit to the first embodiment of the present invention.
Figure 3:
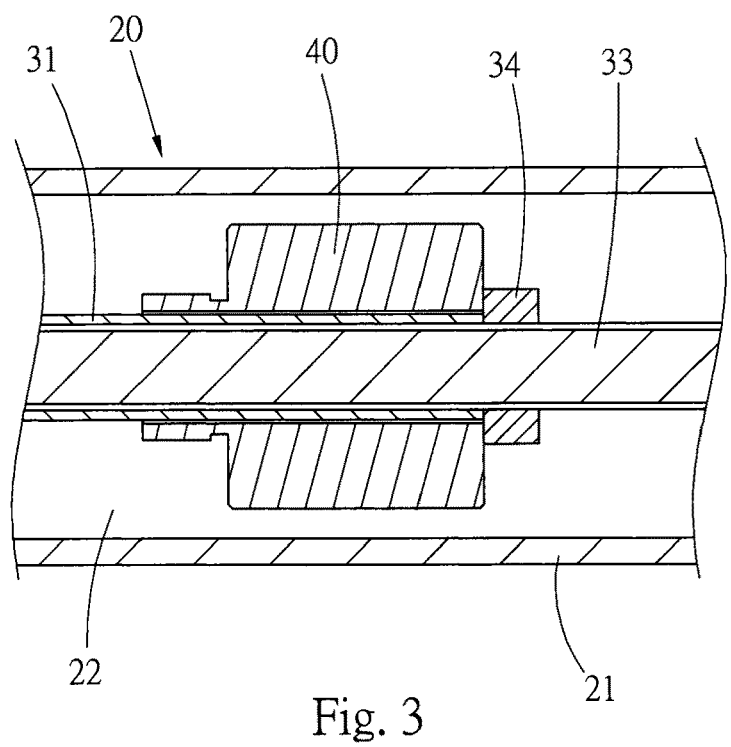
FIG. 3 is a cross-sectional view of the first embodiment depicted in FIG. 1 along a line 3-3.
Figure 4:
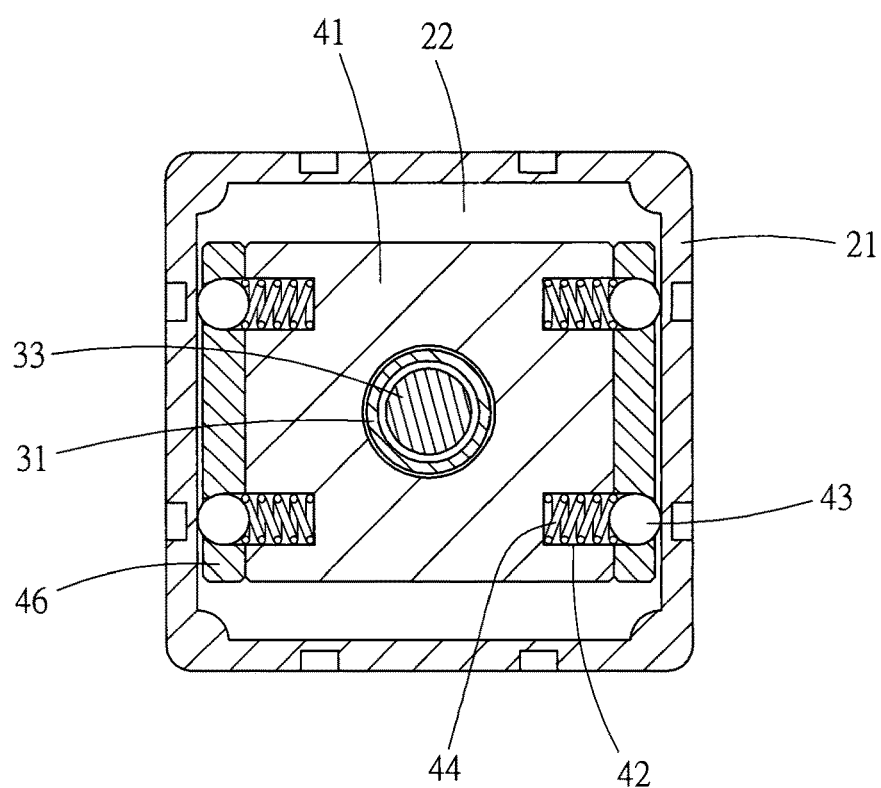
FIG. 4 is a cross-sectional view of the first embodiment depicted in FIG. 1 along a line 4-4.

Refer to FIG. 1 to FIG. 4, the linear actuator of the first embodiment includes a case 20, an actuating unit 30 and a gap compensating unit 4.

The case 20 includes a body 21 and a space 22. The body 21 is configured as a rectangular tube to form the space 22 between the opposite ends of the body 21.

The actuating unit 30 includes a sleeve 31, a rod 32, a screw 33 and a nut 34. The sleeve 31 is located on the screw 33 within the space 22 and is adjacent to the nut 34. The rod 32 is secured with the sleeve 31 to extend outward from the body 21.

The gap compensating unit 40 includes a base 41, a plurality of holes 45, two covers 46, a plurality of openings 47, a plurality of joints 43 and a plurality of elastic units 44. The base 41 is configured as a cube, and reciprocates on the sleeve 31 to prevent from self rotation within the space 22. The holes 45 are positioned on two opposite sides of the base 41. The covers 46 are respectively disposed on the two opposite sides of the base 41 wherein each of the covers 46 includes a plurality of punctures 461, and the base 41 includes a plurality of screw holes 411 whereby the bolts 48 are fastened within the punctures 461 and the screw holes 411 to secure the covers 46 and the base 41. The openings 47 are positioned on the covers 46 and corresponding to the holes 45 to form the apertures 42 wherein the diameter of the openings 47 is less than the diameter of the holes 45.

The joints 43 are in the form of ball, and respectively received in the apertures 42 to partially extend outward. The elastic units 44 are in the form of spring, and respectively received in the apertures 42. One end of the elastic unit 44 is set against the joint 43, and the other end of the elastic unit 44 is set against the bottom of the apertures 42. Thus, the joints 43 are abutted against the inner wall of the body 21, and supported by the actuating unit 30.

As the conventional technology, the screw 33 of the linear actuator is driven by the motor to converse the rotary motion into linear motion through the nut 34 such that the actuating unit 30 can reciprocate linearly.

With the above structure of the first embodiment, the joints 43 are abutted against the inner wall of the body 21 through the elastic units 44 to provide elasticity thereby compensating the offset during the linear motion and maintaining the stability and linearity. Compared with the conventional technology, the linear actuator of the present invention provides the elastic units 44 with adjustable to compensate the larger offset.

Furthermore, the fabrication of the linear actuator of the present invention is enhanced because of the modularized gap compensating unit 40. In addition, the nut 34 secured on the polygonal gap compensating unit 40 can prevent from being rotated to increase the conversion efficiency.

Figure 5:
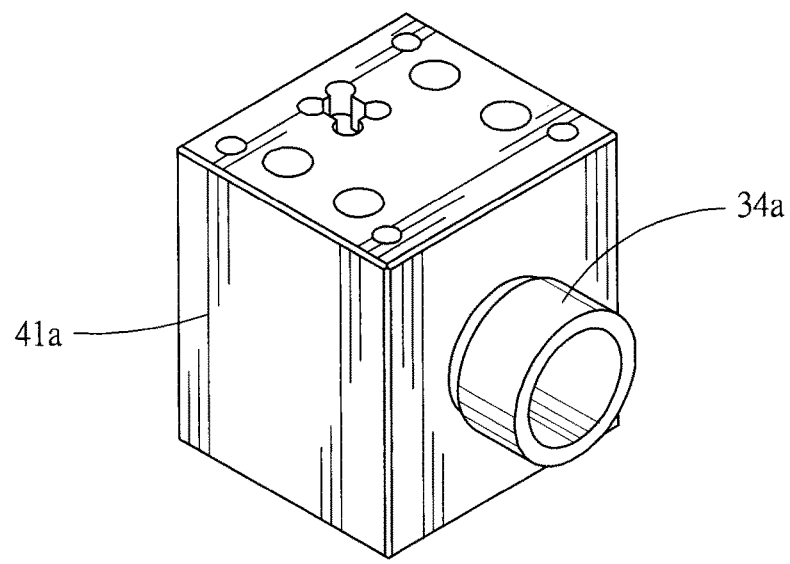
FIG. 5 is a schematic view of a second embodiment of the gap compensating unit of the present invention.

Refer to FIG. 5 which illustrates the second embodiment of the gap compensating unit 40. The nut 34a of the second embodiment is integrated with the base 41a without any combination means.

Moreover, the structures for rotation prevention and space configuration are not limited in the above embodiment. Specifically, there are lots of methods to prevent the nut or the actuating unit from inappropriate operation, so there is no more description for the conventional elements herein.

In other embodiment, the joints and the elastic units are received within the space configured on the actuating unit, and not limited in the above embodiment.

Figure 6:
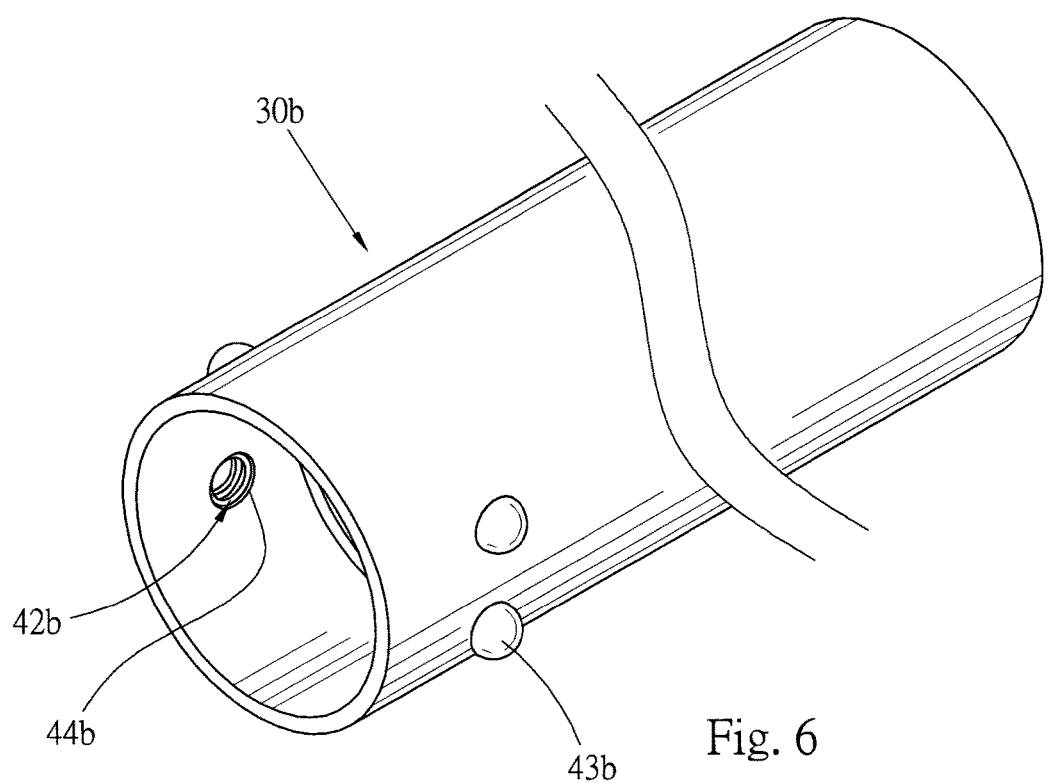
FIG. 6 is a partial schematic view of a third embodiment of the present invention.

Refer to FIG. 6 which illustrates the third embodiment of the present invention. The apertures 42b are positioned on the sleeve of the actuating unit 30b to receive the joints 43b and the elastic unit 44b wherein the joints 43b are abutted against the inner wall of the body 21.

Figure 7:
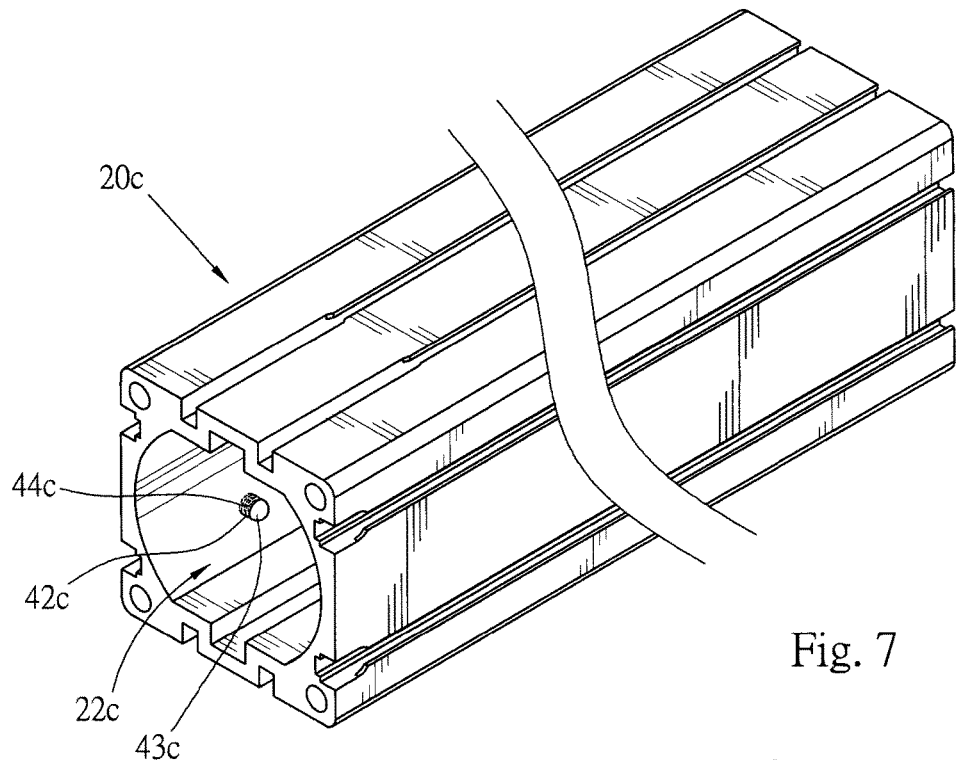
FIG. 7 is a partial schematic view of a fourth embodiment of the present invention.

Refer to FIG. 7 which illustrates the fourth embodiment of the present invention. The apertures 42c are positioned on the inner wall of the case 20c to receive the joints 43c and the elastic unit 44c wherein the joints 43c are abutted against the actuating unit. Therefore, the same function as the first embodiment is provided.

Figure 8:
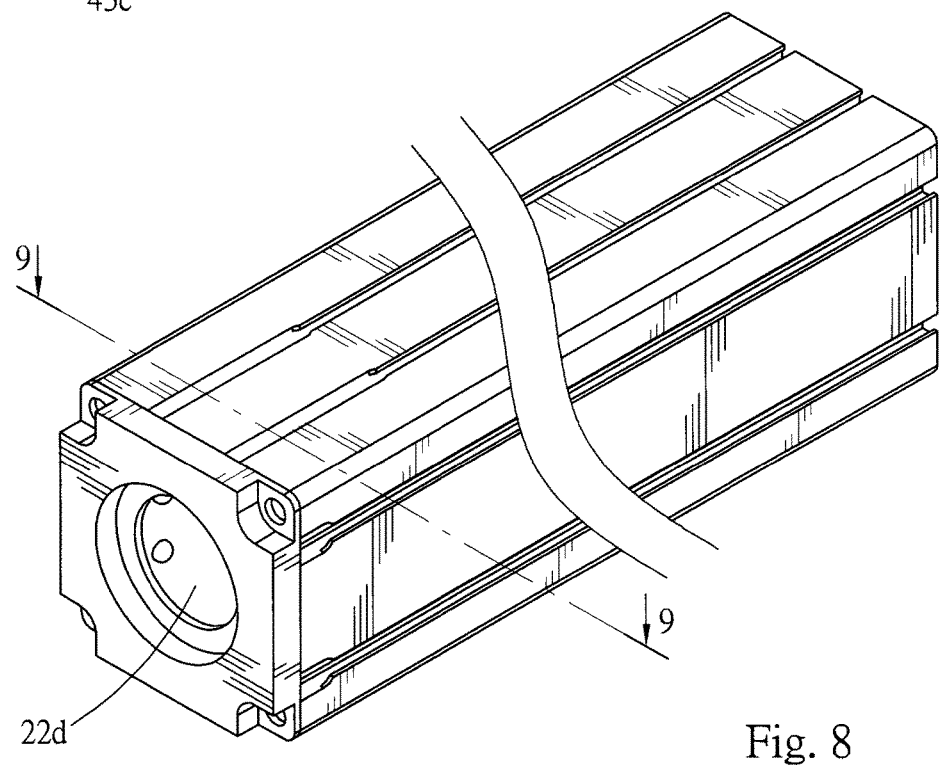
FIG. 8 is a partial schematic view of a fifth embodiment of the present invention.
Figure 9:
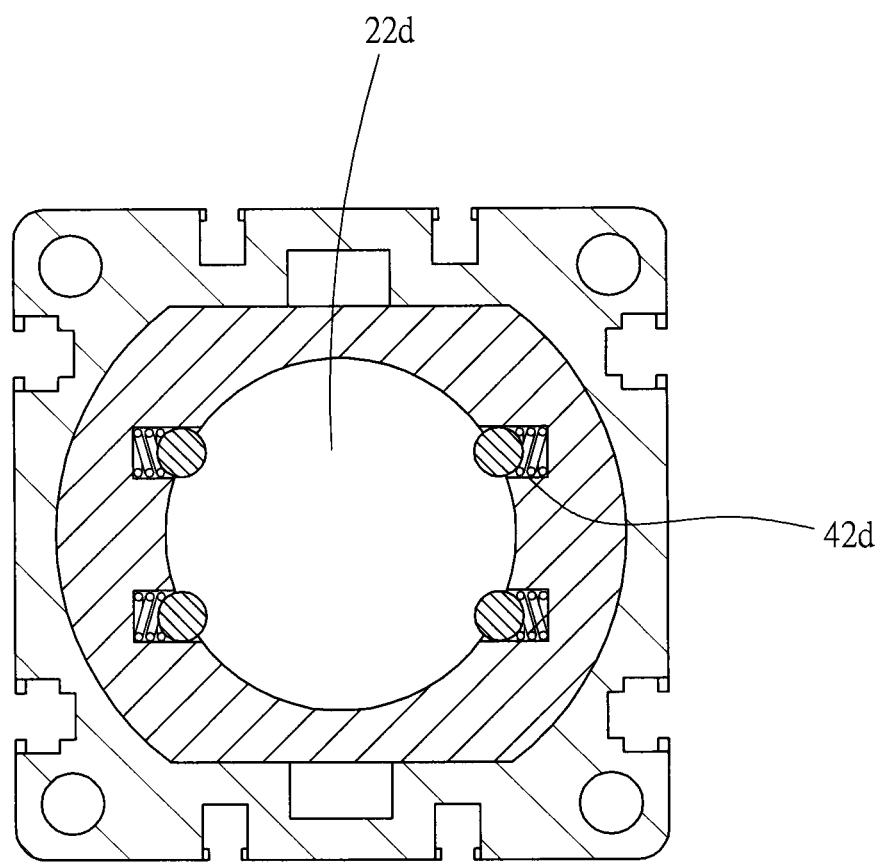
FIG. 9 is cross-sectional view of the fifth embodiment depicted in FIG. 8 along a line 9-9.

Refer to FIG. 8 and FIG. 9 which illustrates the fifth embodiment of the present invention. The fifth embodiment is similar to the fourth embodiment wherein the apertures 42c are positioned on the middle of the body and the apertures 42d are positioned on the flank of the body.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A linear actuator, comprising:
   a case, comprising a body and a space;
   an actuating unit, held in the space; and
   a gap compensating unit, reciprocating on the actuating unit and comprising a base, a plurality of apertures, a plurality of joints and a plurality of elastic units, wherein the apertures are positioned on two opposite sides of the base, the joints are respectively received in the apertures, and the elastic units are respectively received in the apertures to be disposed against the joints and an inner wall of the body;
   wherein the gap compensating unit comprises two covers respectively disposed on the two opposite sides of the base, each of the cover comprises a plurality of openings, and the base comprises a plurality of holes corresponding to the openings to form the apertures.

2. The linear actuator as claimed in claim 1, wherein the diameter of the opening is less than the diameter of the hole.

3. The linear actuator as claimed in claim 1, wherein the gap compensating unit comprises a plurality of bolts, each of the cover comprises a plurality of punctures, and the base comprises a plurality of screw holes whereby the bolts are fastened within the punctures and the screw holes.

4. The linear actuator as claimed in claim 1, wherein the gap compensating unit comprises an axial hole positioned on the base to hold the actuating unit.

5. The linear actuator as claimed in claim 1, wherein the joints are in the form of a ball.

* * * * *